United States Patent
Jung et al.

(10) Patent No.: US 7,319,723 B2
(45) Date of Patent: Jan. 15, 2008

(54) APPARATUS AND METHOD FOR REDUCING PAPR IN AN OFDM MOBILE COMMUNICATION SYSTEM

(75) Inventors: Ki-Ho Jung, Seoul (KR);
Heung-Gyoon Ryu, Chongju-shi (KR);
In-Bae Kim, Chonan-shi (KR);
Byoung-Il Jin, Chonan-shi (KR)

(73) Assignee: Samsung Electronics Co., Ltd. (KR)

( * ) Notice: Subject to any disclaimer, the term of this patent is extended or adjusted under 35 U.S.C. 154(b) by 662 days.

(21) Appl. No.: 10/290,950

(22) Filed: Nov. 8, 2002

(65) Prior Publication Data

US 2003/0142754 A1 Jul. 31, 2003

(30) Foreign Application Priority Data

Nov. 9, 2001 (KR) .................. 10-2001-0069763

(51) Int. Cl.
*H04L 25/49* (2006.01)
*H04L 25/03* (2006.01)

(52) U.S. Cl. .................. 375/296; 375/295; 455/63.1; 455/114.2

(58) Field of Classification Search ................ 375/396, 375/285, 345, 296, 295; 455/63.1, 114.2
See application file for complete search history.

(56) References Cited

U.S. PATENT DOCUMENTS

| | | | | |
|---|---|---|---|---|
| 5,835,536 A | * | 11/1998 | May et al. ................... | 375/260 |
| 6,370,188 B1 | * | 4/2002 | Wu et al. .................... | 375/222 |
| 6,757,299 B1 | * | 6/2004 | Verma ......................... | 370/482 |
| 2002/0122382 A1 | * | 9/2002 | Ma et al. ..................... | 370/208 |
| 2002/0168016 A1 | * | 11/2002 | Wang et al. ................ | 375/260 |

* cited by examiner

*Primary Examiner*—Mohammed Ghayour
*Assistant Examiner*—Leila Malek
(74) *Attorney, Agent, or Firm*—The Farrell Law Firm, P.C.

(57) ABSTRACT

Disclosed is an apparatus and method for reducing a peak-to-average power ratio (PAPR) due to multiple subcarriers in an OFDM (Orthogonal Frequency Division Multiplexing) mobile communication system. In the OFDM mobile communication system, a transmitter pre-emphasizes an output signal of an IFFT (Inverse Fast Fourier Transform) block, and a receiver de-emphasizes a received signal before FFT (Fast Fourier Transform), thereby efficiently reducing PAPR due to multiple subcarriers.

4 Claims, 8 Drawing Sheets

APPARATUS AND METHOD FOR REDUCING PAPR IN AN OFDM MOBILE COMMUNICATION SYSTEM

PRIORITY

This application claims priority to an application entitled "Apparatus and Method for Reducing PAPR in an OFDM Mobile Communication System" filed in the Korean Industrial Property Office on Nov. 9, 2001 and assigned Serial No. 2001-69763, the contents of which are incorporated herein by reference.

BACKGROUND OF THE INVENTION

1. Field of the Invention

The present invention relates generally to a transmission/reception apparatus and method in an OFDM (Orthogonal Frequency Division Multiplexing) mobile communication system, and in particular, to an apparatus and method for reducing a high peak-to-average power ratio (PAPR) caused by multiple subcarriers.

2. Description of the Related Art

Generally, in an OFDM (Orthogonal Frequency Division Multiplexing) technology, spectrums of subchannels overlap with one another while maintaining orthogonality, increasing spectrum efficiency. In addition, modulation is realized by inverse fast Fourier transform (IFFT), and demodulation is realized by fast Fourier transform (FFT).

A brief description will now be made of operation of a transmitter and a receiver for a mobile communication system supporting the OFDM.

In an OFDM transmitter, input data is modulated with subcarriers through scrambler, encoder, and interleaver. The transmitter provides a variable data rate, and has different code rates, interleaving sizes and modulation schemes according to the data rate. Commonly, the encoder uses a code rate of ½ or ¾, and in order to prevent burst errors, a size of the interleaver is determined based on the number (NCBPS) of coded bits mapped per OFDM symbol. The transmitter uses a modulation scheme of QPSK (Quadrature Phase Shift Keying), 8PSK (8-ary Phase Shift Keying), 16QAM (16-ary Quadrature Amplitude Modulation) or 64QAM (64-ary Quadrature Amplitude Modulation) according to the data rate. A predetermined number of pilots are added to the signals modulated with a predetermined number of subcarriers, and the pilot-added modulated signals constitute one OFDM symbol after passing through an IFFT block. A guard period for eliminating inter-symbol interference in a multipath channel environment is inserted into the OFDM symbol, and the guard period-inserted OFDM symbol is finally applied to an RF (Radio Frequency) block through a symbol waveform generator before being transmitted over a channel.

In a receiver, a reverse operation of the transmitter is performed and a synchronization process is added. First, a process of estimating a frequency offset and a symbol offset using a predetermined training symbol must precede. Thereafter, data symbols, from which the guard period is removed, are restored with a predetermined number of subcarriers into restored signals to which a predetermined number of pilots are added, after passing through an FFT block. An equalizer for coping with a path delay phenomenon removes signal distortions caused by a channel from a received signal by estimating a channel condition. Data channel-response-compensated by the equalizer is converted into a bit stream, deinterleaved by a deinterleaver, and output as final data through an encoder for error correction and a descrambler.

The OFDM can realize efficient digital modulator/demodulator, and is less susceptible to frequency-selective fading or narrow-band interference. Therefore, the OFDM has been selected as a standard of the European digital broadcasting system and standards of the high-capacity mobile communication system, such as IEEE 802.11a, IEEE 802.16a and IEEE 802.16b. That is, the OFDM is a technique efficient to high-speed data transmission.

However, since a mobile communication system supporting the OFDM (hereinafter, referred to as "OFDM mobile communication system") transmits data with multiple subcarriers, an amplitude of a final OFDM signal can be expressed as the sum of amplitudes of the multiple subcarriers. In particular, the multiple subcarriers, if they have the same phases, have a very high peak-to-average power ratio (PAPR). In this case, the PAPR deviates from a linear operation range of an amplifier, so an output signal of the amplifier has a distortion.

In the OFDM mobile communication system, amplitude of an OFDM signal is variable according to a phase difference of the subcarriers. In addition, a back-off phenomenon where an operation point is separated far away from the maximum output point of an amplifier occurs, reducing efficiency of the amplifier and increasing power consumption. Such a signal with a high PAPR decreases efficiency of a linear amplifier, and in the case of a nonlinear amplifier, the signal shifts an operation point to a nonlinear region, causing mutual modulation between carriers and spectral regrowth to an adjacent frequency band.

Therefore, the OFDM mobile communication system needs a method for decreasing the PAPR. A typical method for reducing the PAPR is to expand a linear region of a power amplifier in order to prevent signal distortion, so that every signal can be linearly amplified. An alternative method is to induce a back-off phenomenon of a nonlinear amplifier so that the nonlinear amplifier can operate in a linear region. However, the two methods both cause a reduction in power efficiency and an increase in cost.

SUMMARY OF THE INVENTION

It is, therefore, an object of the present invention to provide an apparatus and method for efficiently reducing a peak-to-average power ratio (PAPR) in an OFDM mobile communication system.

It is another object of the present invention to provide an apparatus and method for reducing PAPR by controlling an OFDM symbol value in an OFDM mobile communication system.

It is further another object of the present invention to provide an apparatus and method for applying a pre-emphasis technique in order to reduce PAPR in an OFDM mobile communication system.

It is yet another object of the present invention to provide an apparatus and method for applying a de-emphasis technique in order to reduce PAPR in an OFDM mobile communication system.

It is still another object of the present invention to provide an apparatus and method for selecting a different gain according to a complex baseband OFDM symbol value in an OFDM mobile communication system.

It is still another object of the present invention to provide an apparatus and method for reducing PAPR while minimizing complexity of an OFDM mobile communication system.

It is still another object of the present invention to provide an apparatus and method for reducing PAPR while minimizing a reduction in spectrum efficiency due to transmission of a large amount of PAPR-related additional information in an OFDM mobile communication system.

It is still another object of the present invention to provide a PAPR reduction apparatus and method for preventing a decrease in BER (Bit Error Rate) performance due to generation of in-band noises in an OFDM mobile communication system.

According to a first aspect of the present invention, there is provided a method for controlling a value of symbols in order to reduce a peak-to-average power ratio in a transmitter for a mobile communication system for generating OFDM symbols by performing IFFT on data received through coding and interleaving. The method comprises setting a maximum input value L, a pre-emphasis change point $k_1$, and a de-emphasis change point $k_2$ according to a prescribed output transfer characteristic; receiving the OFDM symbols and pre-emphasizing symbol values of the OFDM symbols at a gain determined by the pre-emphasis change point $k_1$ and the de-emphasis change point $k_2$ if the symbol values are smaller than the pre-emphasis change point $k_1$; and receiving the OFDM symbols, and pre-emphasizing symbol values of the OFDM symbols at a grain determined by the pre-emphasis change point $k_1$ and the de-emphasis change point $k_2$ if the symbol values are larger than or equal to the pre-emphasis change point $k_1$.

According to a second aspect of the present invention, there is provided an apparatus for controlling a value of symbols in order to reduce a peak-to-average power ratio in a transmitter for a mobile communication system for generating OFDM symbols by performing IFFT on data received through coding and interleaving. The apparatus comprises a comparator for comparing a symbol value of each of the OFDM symbols with a predetermined pre-emphasis change point $k_1$; a first operational amplifier for amplifying the symbol value provided from the comparator at a gain determined by the pre-emphasis change point $k_1$ and a predetermined de-emphasis change point $k_2$ if the symbol value is smaller than the pre-emphasis change point $k_1$; a second operational amplifier for amplifying the symbol value provided from the comparator at a gain determined by the pie-emphasis change point $k_1$, the de-emphasis change point $k_2$ and a predetermined maximum input value L if the symbol value is larger than or equal to the pre-emphasis change point $k_1$; and an adder for outputting a controlled symbol value by adding an output of the first operational amplifier to an output of the second operational amplifier.

According to a third aspect of the present invention, there is provided a method for performing de-emphasis on a signal received from a transmitter in a receiver for an OFDM mobile communication system. The method comprises setting a maximum input value L, a pre-emphasis change point $k_1$, and a de-emphasis change point $k_2$ according to a prescribed output transfer characteristic; de-emphasizing a value $S_{pre}(n)$ of the received signal at a gain determined by the pre-emphasis change point $k_1$ and the de-emphasis change point $k_2$ if the value $S_{pre}(n)$ of the received signal is smaller than the de-emphasis change point $k_2$; and de-emphasizing the value $S_{pre}(n)$ of the received signal at a gain determined by the pre-emphasis change point $k_1$, the de-emphasis change point $k_2$ and the maximum input value L if the value $S_{pre}(n)$ of the received signal is larger than or equal to the de-emphasis change point $k_2$.

According to a fourth aspect of the present invention, there is provided a method for performing de-emphasis on a signal received from a transmitter in a receiver for an OFDM mobile communication system. The apparatus comprises a comparator for comparing a value $S_{pre}(n)$ of the received signal with a predetermined de-emphasis change point $k_2$; a first operational amplifier for amplifying the value $S_{pre}(n)$ of the received signal provided from the comparator at a gain determined by the de-emphasis change point $k_2$ and a predetermined pre-emphasis change point $k_1$ if the value $S_{pre}(n)$ of the received signal is smaller than the de-emphasis change point $k_2$; a second operational amplifier for amplifying the value $S_{pre}(n)$ of the received signal provided from the comparator at a gain determined by the pre-emphasis change point $k_1$, the de-emphasis change point $k_2$ and a predetermined maximum input value L if the value $S_{pre}(n)$ of the received signal is larger than or equal to the de-emphasis change point $k_2$; and an adder for adding an output of the first operational amplifier to an output of the second operational amplifier.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings.

In the following description, the present invention provides an apparatus and method for reducing PAPR while maintaining an original signal in an OFDM CDMA (Code Division Multiple Access) mobile communication system. To this end, a transmitter according to an embodiment of the present invention pre-emphasizes an IFFT-transformed OFDM signal before transmission, and a receiver performs de-emphasis on a received signal. Although the specifics such as OFDM modulation, IFFT, FFT, HPA, spectrum efficiency, and bit error rate will be used herein for a better understanding of the present invention, it would be obvious to those skilled in the art that the present invention can readily be implemented without such specifics or by modification of those.

Figure 1:
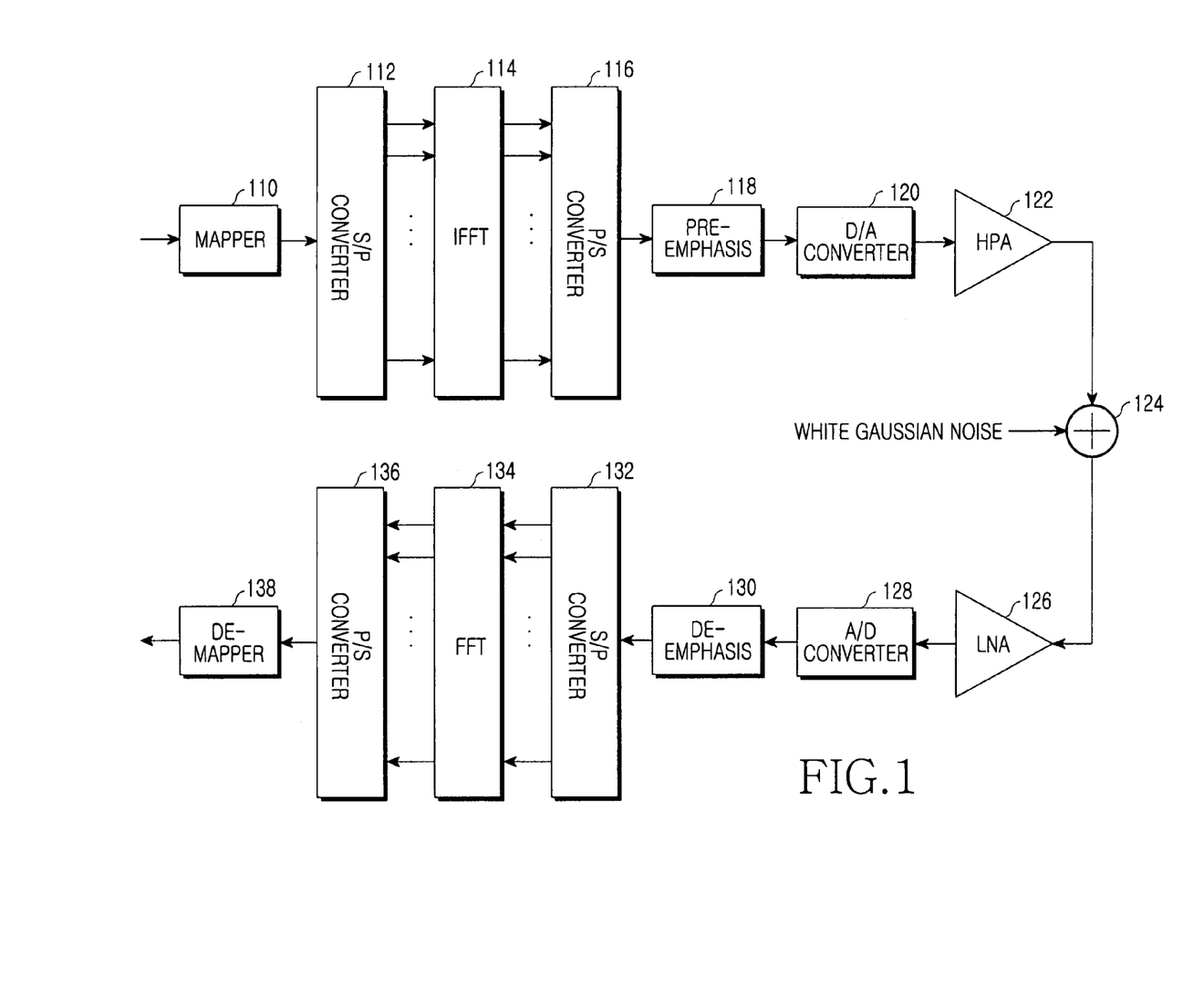
FIG. 1 illustrates a structure of an OFDM mobile communication system supporting according to an embodiment of the present invention.

FIG. 1 illustrates a structure of an OFDM CDMA mobile communication system supporting according to an embodiment of the present invention. FIG. 1 shows a structure of a transmitter comprised of a mapper 110 to a high-power amplifier (HPA) 122, and a structure of a receiver comprised of a low-noise amplifier (LNA) 126 to a de-mapper 138. As illustrated in FIG. 1, the transmitter includes a pre-emphasis block 118 and the receiver includes a de-emphasis block 130.

Commonly, "emphasis" refers to a process of amplifying a high-frequency band component of a signal before transmission, thereby reducing interference or noise. The emphasis is divided into pre-emphasis and de-emphasis. The pre-emphasis is a process of previously emphasizing a specific part of a transmission frequency at a transmitter in order to improve signal-to-noise ratio, frequency characteristic and distortion characteristic, and the de-emphasis is a process of de-emphasizing at a receiver the high-frequency band part which was previously emphasized by the transmitter to improve signal-to-noise ratio before transmission, thereby recovering the original signal.

However, "pre-emphasis" according to an embodiment of the present invention is defined as a process of defining a prescribed reference value and amplifying an OFDM symbol at different gains according to whether a value of the IFFT-transformed OFDM symbol is larger than the reference value or not. Further, "de-emphasis" according to an embodiment of the present invention is defined as a process of defining a prescribed reference value and amplifying a received signal at different gains according to whether a value of the received signal is larger than the reference value or not. Here, the gain can be defined as a transfer characteristic of the pre-emphasis or the de-emphasis.

Herein, a description of an OFDM CDMA mobile communication system according to an embodiment of the present invention will be separated into a description of structure and operation of a transmitter and a description of structure and operation of a receiver.

Structure and Operation of Transmitter

First, a structure of a transmitter according to an embodiment of the present invention will be described with reference to FIG. 1.

Referring to FIG. 1, data to be transmitted by a transmitter is encoded into coded bits at a prescribed code rate, and the coded bits are provided to the mapper 110 after being interleaved. Although there are various coding methods, a coding method for encoding data with a turbo code, an error correction code, is typically used. Here, the prescribed code rate includes ½ or ¾. The mapper 110 modulates the input data by a prescribed modulation scheme (or technique), and outputs modulation symbols. The modulation scheme includes 8PSK, 16QAM, 64QAM and QPSK, and each modulation scheme performs a modulation operation by its unique symbol mapping method. The present invention uses the modulation scheme of QPSK. The modulation symbols output in series from the mapper 110 are provided to a serial-to-parallel (S/P) converter 112. The S/P converter 112 outputs in series the modulation symbols provided from the mapper 110. The modulation symbols output in parallel from the S/P converter 112 are provided to an inverse fast Fourier transform (IFFT) block 114. The IFFT block 114 performs IFFT-based OFDM modulation on the modulation symbols provided from the S/P converter 112, and outputs OFDM symbols. That is, the IFFT block 114 converts a frequency band signal into a time band signal. The OFDM symbols output in parallel from the IFFT block 114 are provided to a parallel-to-serial (P/S) converter 116, which outputs the provided OFDM symbols in series.

More specifically, if a modulation symbol output from the S/P converter 112 is defined as $X_k$ ($0 \leq k \leq N-1$), then complex baseband OFDM symbol value $X_n$, an output of the P/S converter 116, is defined as $$x_n = \frac{1}{\sqrt{N}} \sum_{k=0}^{N-1} X_k e^{j2\pi nk/N}, \ 0 \leq n \leq N-1 \qquad \text{Equation (1)}$$

Here, N represents the number of subcarriers. If the N is increased, OFDM signals approximate to Gaussian distribution. Conventionally, PAPR by the $x_n$ is defined as $$PAPR = \frac{\max\{|x_n^2|\}}{E\{x_n^2\}} \qquad \text{Equation (2)}$$

Here, E(*) represents an average of *. In Equation (2), a numerator represents peak power and a denominator represents average power. The present invention increases the average power by increasing the $x_n^2$ through pre-emphasis, thereby reducing the PAPR. The increased $x_n^2$ is defined as S(n). Of course, the increase in the $x_n^2$ will cause an increase in the peak power. However, the peak power, since it is concluded into a maximum power value, can achieve an object of the present invention for reducing the PAPR.

The OFDM symbols output from the P/S converter 116 in accordance with Equation (1) are provided to the pre-emphasis block 118. The pre-emphasis block 118 with a prescribed transfer characteristic pre-emphasizes the provided OFDM symbols and outputs power-increased OFDM symbols S(n). Therefore, the PAPR determined by substituting the pre-emphasized S(n) into the $x_n^2$ of Equation (2) is decreased compared with the conventional PAPR.

A digital-to-analog (D/A) converter 120 converts the digital S(n provided from the pre-emphasis block 118 into an analog signal and provides its output to the high-power amplifier (HPA) 122. The high-power amplifier 122 amplifies a signal from the D/A converter 120 and transmits the amplified signal to the receiver.

Figure 6:
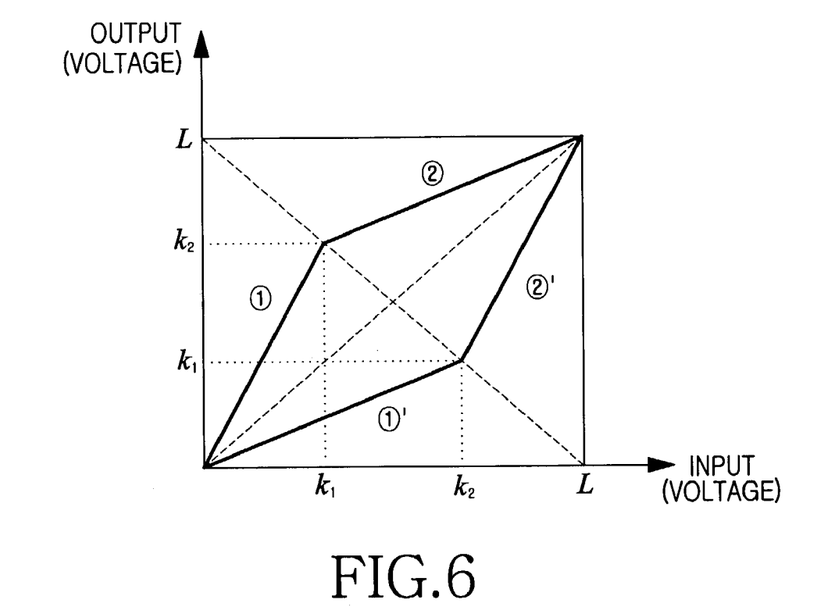
FIG. 6 illustrates input and output transfer characteristics for a pre-emphasis block and a de-emphasis block according to an embodiment of the present invention.

Input transfer characteristics of the pre-emphasis block 118 are represented by (1) and (2) of FIG. 6. Therefore, the pre-emphasis block 118 performs pre-emphasis on OFDM symbols using the input transfer characteristics illustrated in FIG. 6. In FIG. 6, L represents maximum amplitude of the OFDM symbols output from the IFFT block 114. Since the amplitude of the OFDM symbols becomes the maximum amplitude when the subcarriers have their maximum values. Thus, the L is identical to the total number of the subcarriers. Therefore, an input to the pre-emphasis block 118 has amplitude of 0 to L. Further, $k_1$ illustrated in FIG. 6 represents amplitude defined as a pre-emphasis change point.

Figure 2:
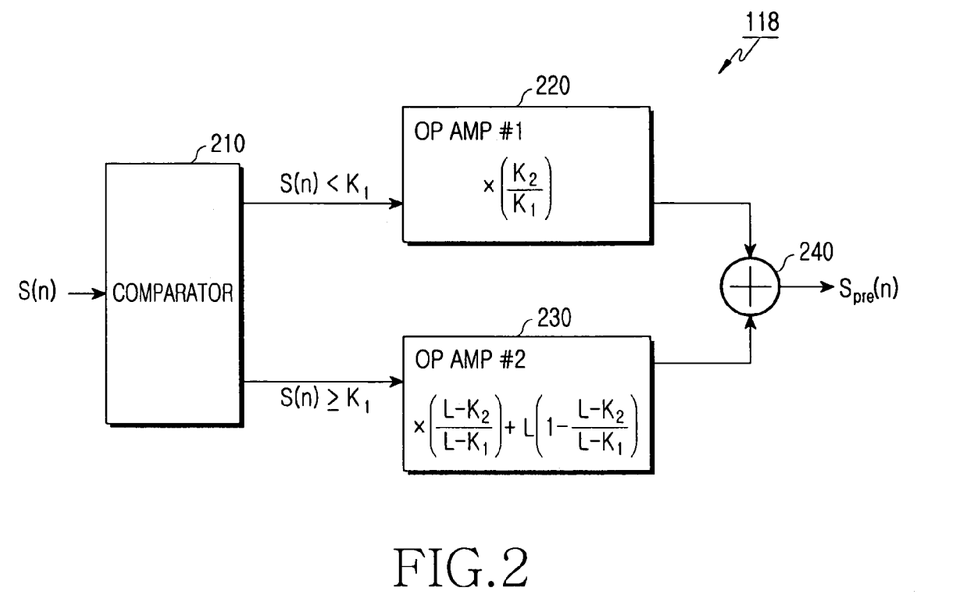
FIG. 2 illustrates a detailed structure of the pre-emphasis block in FIG. 1.

FIG. 2 illustrates a detailed structure of the pre-emphasis block 118. Referring to FIG. 2, the OFDM symbol S(n) output from the P/S converter 116 is applied to a comparator 210. The comparator 210 compares the S(n) with a prescribed comparison value $k_1$ and differently outputs the S(n) according to the comparison result. That is, the comparator 210 outputs the S(n) to a first operational amplifier 220 if the S(n) belongs to a range of 0 to $k_1$ (S(n)<$k_1$). However, if the S(n) belongs to a range of $k_1$ to L (S(n)≥$k_1$), the comparator 210 outputs the S(n) to a second operational amplifier 230. The reason for defining the range from 0 to L is because amplitude of the S(n) applied to the pre-emphasis block 118 is determined between 0 to L. Therefore, the L can be defined as the maximum amplitude of the S(n). The first operational amplifier 220 and the second operational amplifier 230 each amplitude the S(n) provided from the comparator 210 by different transfer characteristics. The transfer characteristics can be expressed as slopes represented by (1) and (2) of FIG. 6. That is, a transfer characteristic of the first operational amplifier 220 is a slope "$k_2/k_1$" represented by (1) of FIG. 6, and a transfer characteristic of the second operational amplifier 230 is a slope $$\text{``}\left(\frac{L-k_2}{L-k_1}\right) + L\left(1 - \frac{L-k_2}{L-k_1}\right)\text{''}$$

represented by (2) of FIG. 6. Preferably, the transfer characteristic of the first operational amplifier 220 should have a higher gain than the transfer characteristic of the second operational amplifier 230. This means that the transfer characteristic of the first operational amplifier 220 must have a steeper slope, compared with the transfer characteristic of the second operational amplifier 230.

The first operational amplifier 220 outputs a product of the S(n) provided from the comparator 210 and a prescribed value (or the transfer characteristic $k_2/k_1$). That is, the first operational amplifier 220 amplifies the S(n) by the transfer characteristic (or gain) defined as $k_2/k_1$. The second operational amplifier 230 outputs a product of the S(n) provided from the comparator 210 and a prescribed value $$\left(\text{or the transfer characteristic}\left(\frac{L-k_2}{L-k_1}\right) + L\left(1 - \frac{L-k_2}{L-k_1}\right)\right).$$

That is, the second operational amplifier 230 amplifies the S(n) by the transfer characteristic (or gain) defined as $$\left(\frac{L-k_2}{L-k_1}\right) + L\left(1 - \frac{L-k_2}{L-k_1}\right).$$

Outputs of the first operational amplifier 220 and the second operational amplifier 230 are provided to an adder 240, and the adder 240 outputs $S_{pre}(n)$ by adding the two inputs.

An operation of the pre-emphasis block 118 illustrated in FIG. 2 can be expressed by $$S_{pre}(n) = \frac{k_2}{k_1}S(n), \ 0 \leq S(n) < k_1$$

$$S_{pre}(n) = \frac{L-k_2}{L-k_1}S(n) + L\left(1 - \frac{L-k_2}{L-k_1}\right), \ k_1 \leq S(n) < L$$

Equation (3)

Figure 4:
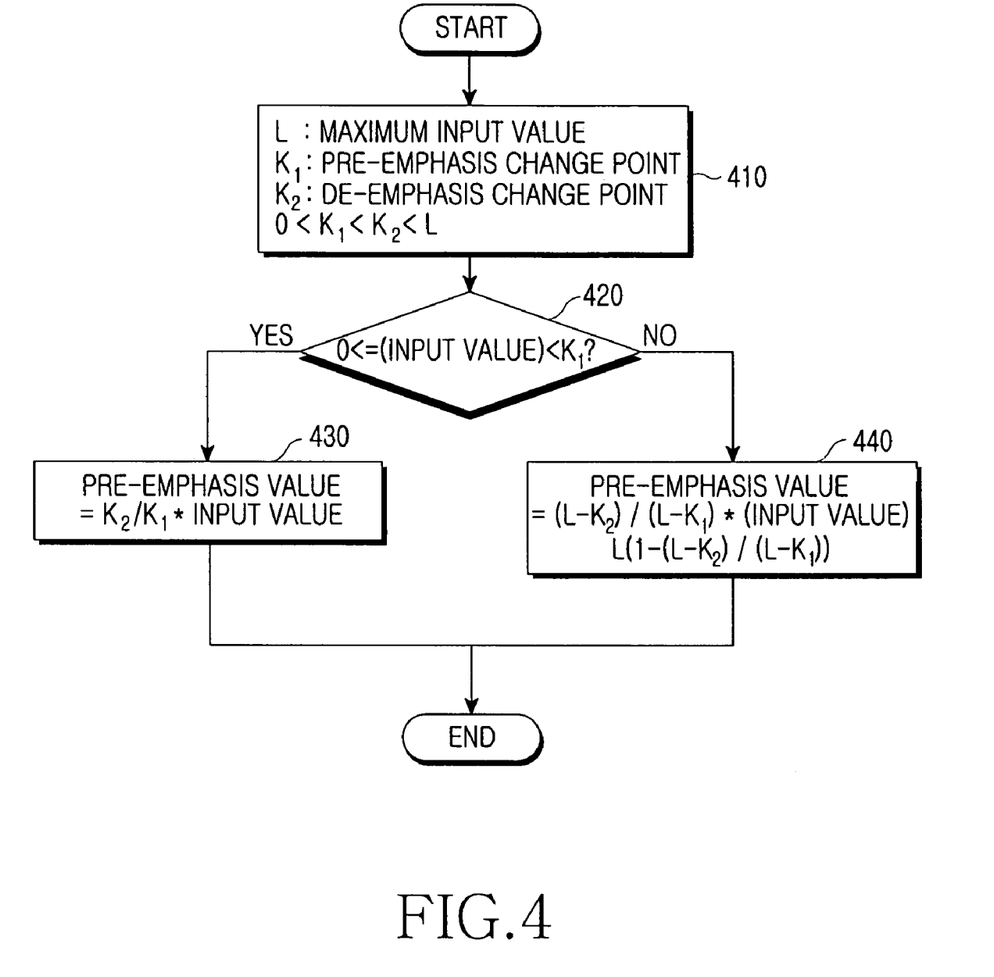
FIG. 4 is a flowchart illustrating a the pre-emphasis procedure according to an embodiment of the present invention.

FIG. 4 is a flowchart illustrating an operation of the pre-emphasis block 118. Referring to FIG. 4, the pre-emphasis block 118 determines in step 410 a maximum input value L, a pre-emphasis change point $k_1$, a de-emphasis change point $k_2$, and a range of the $k_1$ and the $k_2$. The pre-emphasis change point $k_1$ and the de-emphasis change point $k_2$ are each determined according to a position where distribution of the OFDM modulation is massed. After determining the initial values, the pre-emphasis block 118 receives in step 420 the OFDM symbol S(n) provided from the P/S converter 116 and determines whether the S(n) satisfies a first condition. The first condition is 0≤S(n)≤$k_1$. If the S(n) satisfies the first condition, the pre-emphasis block 118 calculates in step 430 a pre-emphasis value $S_{pre}$ in accordance with a first formula of Equation (3). That is, the pre-emphasis block 118 outputs a pre-emphasis value $S_{pre}(n)$ determined by multiplying the S(n) by the transfer characteristic $k_2/k_1$. However, if the S(n) does not satisfy the first condition, the pre-emphasis block 118 calculates in step 440 a pre-emphasis value $S_{pre}$ in accordance with a second formula of Equation (3). That is, the pre-emphasis block 118 outputs a pre-emphasis value $S_{pre}(n)$ determined by multiplying the S(n) by the transfer characteristic $$\left(\frac{L-k_2}{L-k_1}\right) + L\left(1 - \frac{L-k_2}{L-k_1}\right).$$

That the S(n) does not satisfy the first condition means that the S(n) satisfies a second condition of $k_1 \leq S(n) \leq L$.

Summarizing operation of the pre-emphasis block 118, if an input value S(n) to the pre-emphasis block 118 has a level of 0 to $k_1$ (0≤S(n)≤$k_1$), the pre-emphasis block 118 provides a pre-emphasis result value $S_{pre}(n)$ calculated by $k_2/k_1 S(n)$ to the D/A converter 120. However, if an input value S(n) to the pre-emphasis block 118 has a level of $k_1$ to L ($k_1$≤S(n)≤L), the pre-emphasis block 118 provides a pre-emphasis result value $S_{pre}(n)$ calculated by $$\frac{L-k_1}{L-k_2}S(n) + L\left(1 - \frac{L-k_1}{L-k_2}\right) \text{ to the } D/A \text{ converter 120.}$$

In FIG. 6, since amplitude of an OFDM signal has Gaussian distribution, average power of the signals pre-emphasized by Equation (3) becomes higher than average power of non-pre-emphasized OFDM signals, reducing PAPR. Therefore, PAPR of the OFDM symbol after passing through the pre-emphasis block 118 with the transfer characteristic illustrated in FIG. 6 is determined by $$PAPR_{pre} = \frac{\max\{|\tilde{x}_n^2|\}}{E\{\tilde{x}_n^2\}} \qquad \text{Equation (4)}$$

Here, $$\tilde{x}_n^2$$

represents a pre-emphasized signal. The pre-emphasized signal is identical in peak power to the original OFDM signal.

Structure and Operation of Receiver

First, a structure of a receiver according to an embodiment of the present invention will be described with reference to FIG. 1.

Referring to FIG. 1, a signal transmitted from the transmitter is applied to the low-noise amplifier (LNA) 126, and the low-noise amplifier 126 low-noise-amplifies the received signal to suppress a noise component. The signal provided to the low-noise amplifier 126, since it is a signal transmitted from the transmitter over a radio channel, includes a white Gaussian noise. The signal output from the low-noise amplifier 126 is provided to an analog-to-digital (A/D) converter 128. The A/D converter 128 converts an analog signal output from the low-noise amplifier 126 into a digital signal, and provides the converted digital signal to the de-emphasis block 130. The de-emphasis block 130 performs de-emphasis on the converted digital signal, and outputs its result value. For example, output transfer characteristics of the de-emphasis block 130 are represented by (1)' and (2)' of FIG. 6. The de-emphasis block 130 de-emphasizes the received $S_{pre}(n)$ with the output transfer characteristics illustrated in FIG. 6.

The result value from the de-emphasis block 130 is provided to an S/P converter 132, which outputs its input signals in parallel. Outputs of the S/P converter 132 are FFT-transformed by an FFT block 134. The FFT, a process of commonly converting a time band signal into a frequency band signal, corresponds to the IFFT performed in the transmitter. The FFT-transformed signals are provided to a P/S converter 136, which outputs its input signals in series. Signals output from the P/S converter 136 are demodulated by the de-mapper 138, and then restored into original signals through interleaving and decoding.

Figure 3:
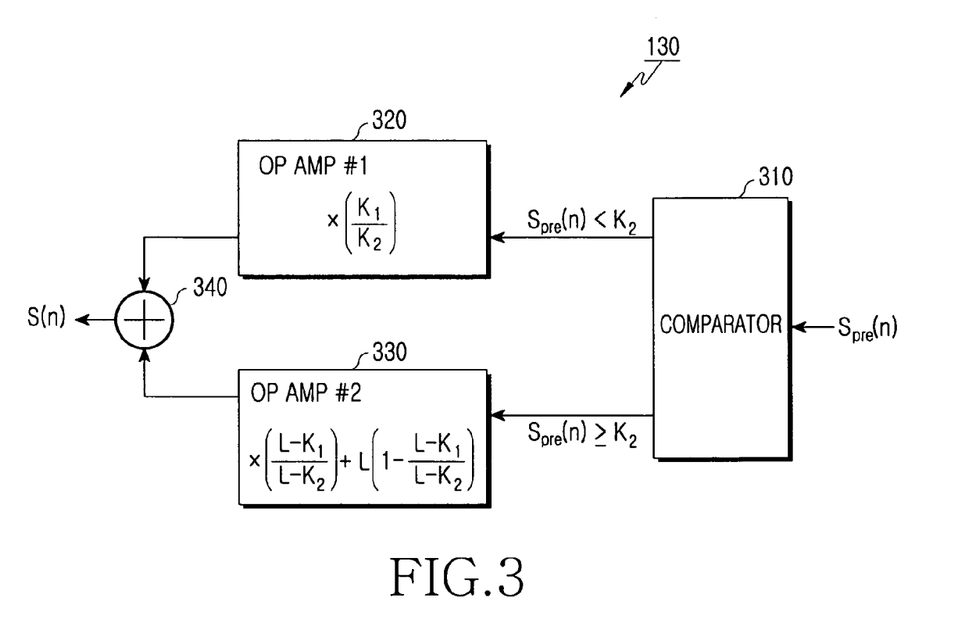
FIG. 3 illustrates a detailed structure of the de-emphasis block in FIG. 1.

FIG. 3 illustrates a detailed structure of the de-emphasis block 130 in FIG. 1. Referring to FIG. 3, an output $S_{pre}(n)$ of the A/D converter 128 is applied to a comparator 310, and the comparator 310 compares the $S_{pre}(n)$ with a prescribed comparison value $k_2$ and differently outputs the $S_{pre}(n)$ according to the comparison result. That is, the comparator 310 outputs the $S_{pre}(n)$ to a first operational amplifier 320 if the $S_{pre}(n)$ belongs to a range of 0 to $k_2$ ($S_{pre}(n)<k_2$). However, if the $S_{pre}(n)$ belongs to a range of $k_2$ to L ($S_{pre}(n) \geq k_2$), the comparator 310 outputs the $S_{pre}(n)$ to a second operational amplifier 330. The reason for defining the range from 0 to L is because amplitude of S(n) in the transmitter is determined between 0 to L. Therefore, the L can be defined as the maximum amplitude of the $S_{pre}(n)$. The first operational amplifier 320 and the second operational amplifier 330 each amplitude the $S_{pre}(n)$ provided from the comparator 310 by different transfer characteristics. The transfer characteristics can be expressed as slopes represented by (1)' and (2)' of FIG. 6. That is, a transfer characteristic of the first operational amplifier 320 is a slope "$k_1/k_2$" represented by (1)' of FIG. 6, and a transfer characteristic of the second operational amplifier 330 is a slope $$\left(\frac{L-k_1}{L-k_2}\right) + L\left(1 - \frac{L-k_1}{L-k_2}\right)$$

represented by (2)' of FIG. 6. Preferably, the transfer characteristic of the first operational amplifier 320 should have a lower gain than the transfer characteristic of the second operational amplifier 330. This means that the transfer characteristic of the first operational amplifier 320 must have a gentler slope, compared with the transfer characteristic of the second operational amplifier 330.

The first operational amplifier 320 outputs a product of the $S_{pre}(n)$ provided from the comparator 310 and a prescribed value (or the transfer characteristic $k_1/k_2$). That is, the first operational amplifier 320 amplifies the $S_{pre}(n)$ by the transfer characteristic (or gain) defined as $k_1/k_2$. The second operational amplifier 330 outputs a product of the $S_{pre}(n)$ provided from the comparator 310 and a prescribed value $$\text{(or the transfer characteristic} \left(\frac{L-k_1}{L-k_2}\right) + L\left(1 - \frac{L-k_1}{L-k_2}\right)\text{)}.$$

Outputs of the first operational amplifier 320 and the second operational amplifier 330 are provided to an adder 340, and the adder 340 outputs S(n) by adding the two inputs.

An operation of the de-emphasis block 130 illustrated in FIG. 3 can be expressed by $$S(n) = \frac{k_1}{k_2} S_{pre}(n), \ 0 \leq S_{pre}(n) < k_2 \qquad \text{Equation (5)}$$

$$S(n) = \frac{L-k_1}{L-k_2} S_{pre}(n) + L\left(1 - \frac{L-k_1}{L-k_2}\right), k_2 \leq S_{pre}(n) \leq L$$

Figure 5:
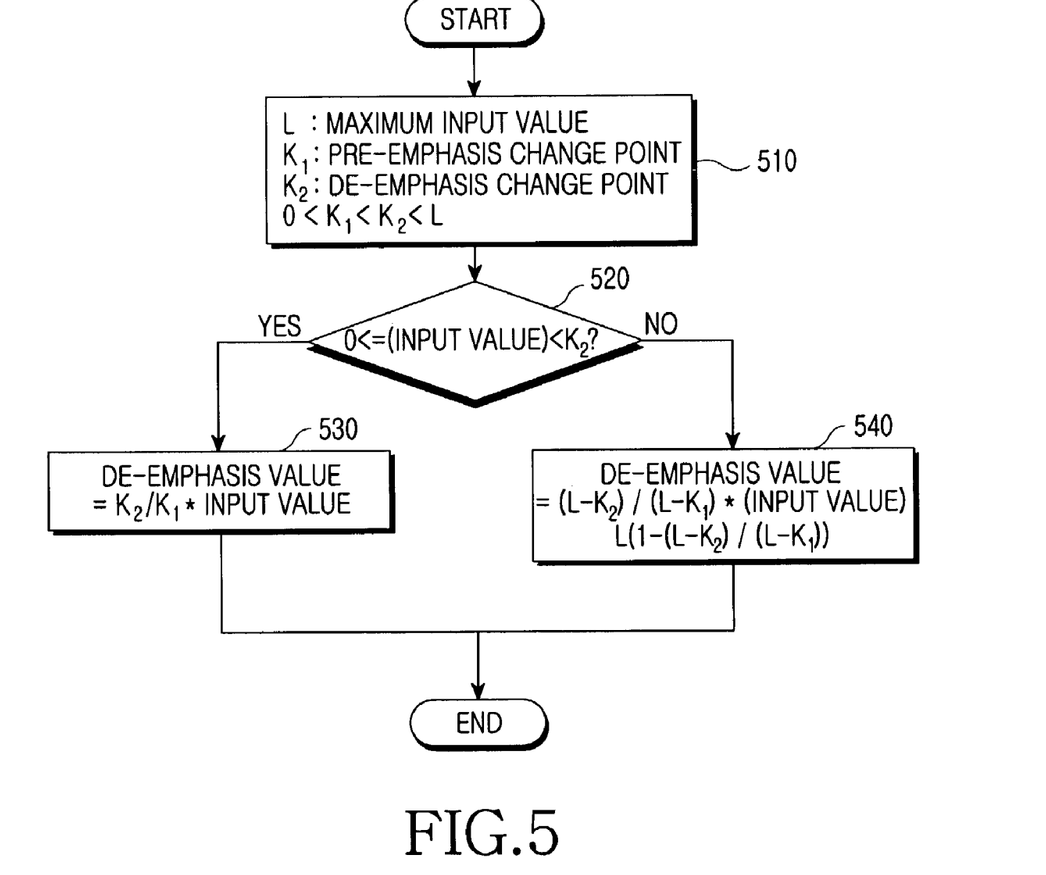
FIG. 5 is a flowchart illustrating a de-emphasis procedure according to an embodiment of the present invention.

FIG. 5 is a flowchart illustrating an operation of the de-emphasis block 130. Referring to FIG. 5, the de-emphasis block 130 determines in step 510 a maximum input value L, a pre-emphasis change point $k_1$, a de-emphasis change point $k_2$, and a range of the $k_1$ and the $k_2$. After determining the initial values, the de-emphasis block 130 receives in step 520 the $S_{pre}(n)$ provided from the A/D converter 128 and determines whether the $S_{pre}(n)$ satisfies a first condition. The first condition is $0 \leq S_{pre}(n) \leq k_2$. If the $S_{pre}(n)$ satisfies the first condition, the de-emphasis block 130 calculates in step 530 a de-emphasis value S(n) in accordance with a first formula of Equation (5). That is, the de-emphasis block 130 outputs a de-emphasis value S(n) determined by multiplying the $S_{pre}(n)$ by the transfer characteristic $k_1/k_2$. However, if the $S_{pre}(n)$ does not satisfy the first condition, the de-emphasis block 130 calculates in step 540 a de-emphasis value S(n) in accordance with a second formula of Equation (5). That is, the de-emphasis block 130 outputs a de-emphasis value S(n) determined by multiplying the $S_{pre}(n)$ by the transfer characteristic $$\left(\frac{L-k_1}{L-k_2}\right)+L\left(1-\frac{L-k_1}{L-k_2}\right).$$

That the $S_{pre}(n)$ does not satisfy the first condition means that the $S_{pre}(n)$ satisfies a second condition of $k_2 \leq S_{pre}(n) \leq L$.

Summarizing operation of the de-emphasis block 130, if an input value $S_{pre}(n)$ to the de-emphasis block 130 has a level of 0 to $k_2$ ($0 \leq S_{pre}(n) \leq k_2$), the de-emphasis block 130 provides a de-emphasis result value S(n) calculated by $k_1/k_2 S(n)$ to the S/P converter 132. However, if an input value $S_{pre}(n)$ to the de-emphasis block 130 has a level of $k_2$ to L ($k_2 \leq S_{pre}(n) \leq L$), the de-emphasis block 130 provides a de-emphasis result value S(n) calculated by $$\frac{L-k_1}{L-k_2}S(n)+L\left(1-\frac{L-k_1}{L-k_2}\right)$$

to the S/P converter 132.

Summarizing the embodiment of the present invention, a complex baseband OFDM symbol value is compared with a prescribed value $k_1$. If the complex baseband OFDM symbol value has a level of 0 to $k_1$, the transmitter pre-emphasizes the OFDM symbol value with the transfer characteristic represented by (1) of FIG. 6, and the receiver performs de-emphasis with the transfer characteristic represented by (1)' of FIG. 6. However, if the complex baseband OFDM symbol value has a level of $k_1$ to L, the transmitter performs pre-emphasis with the transfer characteristic represented by (2) of FIG. 6, and the receiver performs de-emphasis with the transfer characteristic represented by (2)' of FIG. 6. Therefore, the present invention has the reduced number of calculations, making it possible to simply realize hardware using a DSP (Digital Signal Processor) device.

Figure 7:
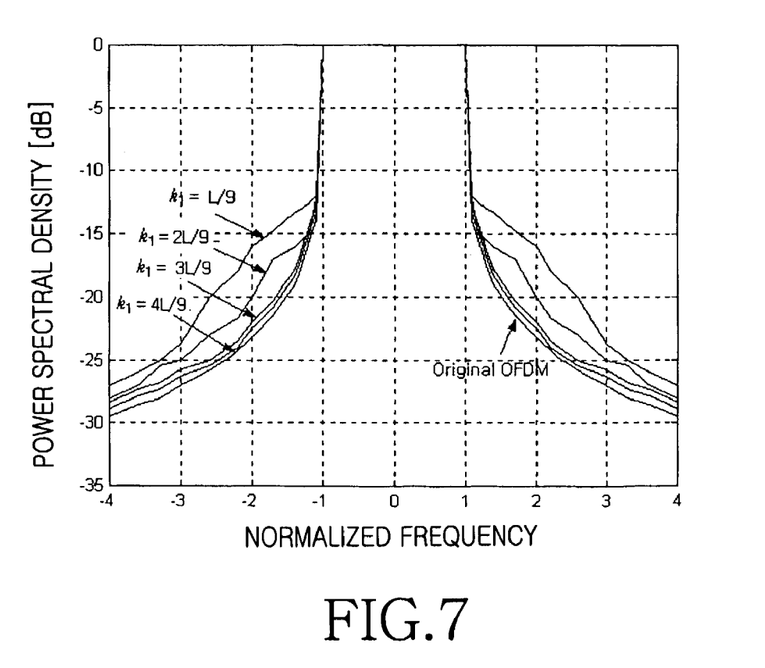
FIG. 7 illustrates a spectrum of an OFDM signal to which a pre-emphasis technique according to an embodiment of the present invention is applied.
Figure 8:
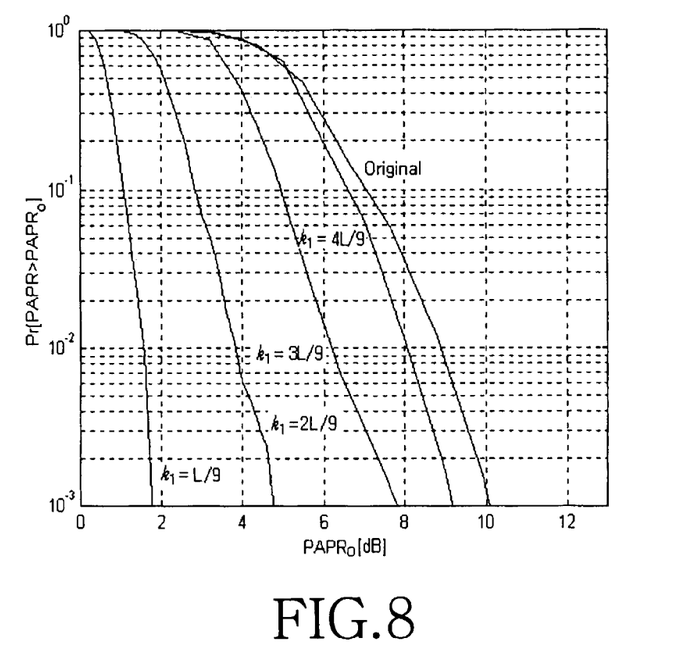
FIG. 8 illustrates distribution of PAPR for an OFDM signal to which the pre-emphasis technique according to an embodiment of the present invention is applied.

FIG. 7 illustrates spectrum efficiency of the pre-emphasis technique according to an embodiment of the present invention. In order to show PAPR distribution of an OFDM signal to which the pre-emphasis technique according to an embodiment of the present invention is applied, CCDF (Complementary Cumulative Distributed Function) is illustrated in FIG. 8. It is assumed that a simulation condition used for performance comparison in FIGS. 7 and 8 is determined such that in an OFDM mobile communication system using a modulation scheme of QPSK and 16 subcarriers, over-sampling is performed 8 times, and the pie-emphasis technique has pre-emphasis change points $(k_1,k_2)$ of (L/9,8L/9), (2L/9,7L/9), (3L/9,6L/9), and (4L/9,5L/9). Here, the $k_1$ and the $k_2$ should not necessarily be an integer, as long as they satisfy a relative ratio thereof.

FIG. 7 illustrates a spectrum of an OFDM symbol to which a pre-emphasis technique according to an embodiment of the present invention is applied. It is noted from FIG. 7 that compared with a spectrum of an OFDM symbol to which the pre-emphasis technique is not applied, as a pre-emphasis ratio is increased higher and higher, spectral regrowth to an adjacent channel is increased more and more. However, a level of the spectral regrowth is smaller as compared with the existing clipping method.

FIG. 8 illustrates CCDF of PAPR for an OFDM symbol to which the pre-emphasis technique according to an embodiment of the present invention is applied. When the CCDF is $10^{-3}$ and the pre-emphasis change point is $k_1=1/9$, the PAPR is minimized to 1.8 dB.

Figure 9:
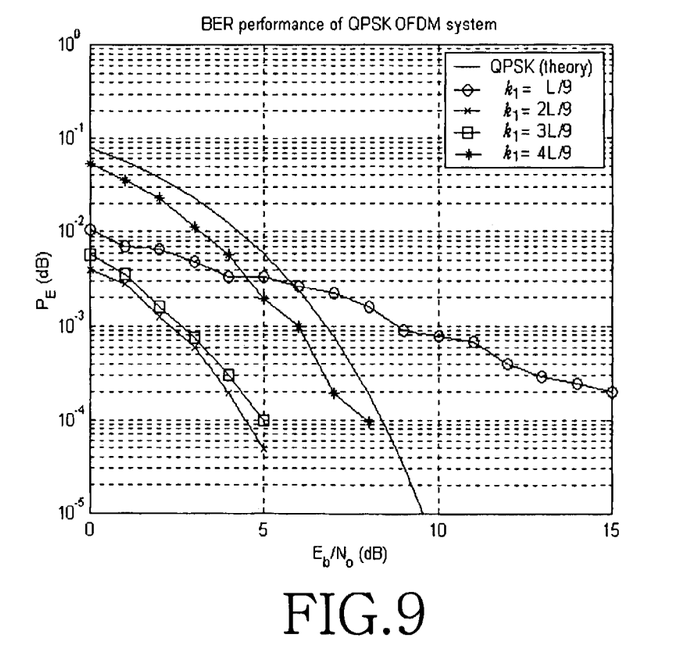
FIG. 9 illustrates BER performance of an OFDM system to which the pre-emphasis technique according to an embodiment of the present invention is applied.

FIG. 9 illustrates BER performance of an OFDM system to which the pre-emphasis technique according to an embodiment of the present invention is applied. As illustrated in FIG. 9, it is possible to achieve noise suppression by applying the pre-emphasis technique according to an embodiment of the present invention, thus contributing to remarkable improvement of BER performance Embodiment of Transmitter First, it will be assumed that when 224 data inputs illustrated in Table 1 are received, an OFDM system, in which QPSK modulation and an ideal HPA are used and 16 subcarriers with a noise-free environment are used, uses a pre-emphasis technique with a pre-emphasis change point of 3/9.

TABLE 1

| 1 | −1 | −1 | −1 | −1 | 1 | 1 | 1 | −1 | −1 | 1 | 1 | 1 | −1 | −1 | 1 |
| 1 | 1 | 1 | 1 | 1 | 1 | −1 | 1 | −1 | 1 | 1 | 1 | −1 | 1 | −1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | −1 | 1 | 1 | 1 | −1 | −1 | −1 | −1 | 1 | 1 | 1 | −1 |
| −1 | −1 | 1 | −1 | −1 | 1 | 1 | 1 | −1 | −1 | −1 | 1 | −1 | 1 | 1 | 1 |
| 1 | −1 | 1 | −1 | 1 | −1 | 1 | −1 | 1 | −1 | 1 | −1 | 1 | 1 | 1 | −1 |
| 1 | −1 | 1 | −1 | 1 | −1 | 1 | −1 | 1 | −1 | 1 | −1 | 1 | −1 | 1 | −1 |
| 1 | 1 | −1 | 1 | −1 | 1 | 1 | 1 | 1 | 1 | 1 | 1 | 1 | 1 | 1 | 1 |
| 1 | −1 | −1 | −1 | −1 | −1 | 1 | −1 | 1 | −1 | 1 | −1 | 1 | 1 | 1 | −1 |
| −1 | −1 | −1 | −1 | −1 | −1 | −1 | −1 | −1 | −1 | −1 | −1 | −1 | −1 | −1 | −1 |
| −1 | −1 | −1 | −1 | −1 | −1 | −1 | −1 | −1 | −1 | −1 | −1 | −1 | −1 | −1 | −1 |
| −1 | −1 | 1 | 1 | −1 | −1 | 1 | 1 | 1 | −1 | 1 | −1 | 1 | 1 | −1 | 1 |
| −1 | −1 | −1 | 1 | 1 | 1 | 1 | −1 | −1 | 1 | 1 | 1 | −1 | 1 | −1 | 1 |

Table 1 illustrates 224 randomized data inputs. The 224 data inputs are QPSK-modulated in such a manner that two data inputs are mapped to one QPSK symbol, thereby generating 112 modulation symbol values illustrated in Table 2. The mapped data is normalized to set power of a symbol to 1. Table 2 illustrates symbol values determined by performing QPSK modulation and normalization on the data inputs of Table 1.

TABLE 2

| | | | |
|---|---|---|---|
| 0.7071 − 0.7071i | −0.7071 − 0.7071i | −0.7071 + 0.7071i | 0.7071 + 0.7071i |
| −0.7071 − 0.7071i | 0.7071 + 0.7071i | 0.7071 − 0.7071i | −0.7071 + 0.7071i |
| 0.7071 + 0.7071i | 0.7071 + 0.7071i | 0.7071 + 0.7071i | −0.7071 + 0.7071i |
| −0.7071 + 0.7071i | 0.7071 + 0.7071i | −0.7071 + 0.7071i | −0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | −0.7071 + 0.7071i | 0.7071 + 0.7071i |
| −0.7071 − 0.7071i | −0.7071 − 0.7071i | 0.7071 + 0.7071i | 0.7071 − 0.7071i |
| −0.7071 − 0.7071i | 0.7071 − 0.7071i | −0.7071 + 0.7071i | 0.7071 + 0.7071i |
| −0.7071 − 0.7071i | −0.7071 + 0.7071i | −0.7071 + 0.7071i | 0.7071 + 0.7071i |
| 0.7071 − 0.7071i | 0.7071 − 0.7071i | 0.7071 − 0.7071i | 0.7071 − 0.7071i |
| 0.7071 − 0.7071i | 0.7071 − 0.7071i | 0.7071 − 0.7071i | 0.7071 − 0.7071i |
| 0.7071 − 0.7071i | 0.7071 − 0.7071i | 0.7071 − 0.7071i | 0.7071 − 0.7071i |
| 0.7071 + 0.7071i | −0.7071 + 0.7071i | −0.7071 + 0.7071i | 0.7071 + 0.7071i |
| 0.7071 + 0.7071i | 0.7071 + 0.7071i | 0.7071 − 0.7071i | −0.7071 + 0.7071i |
| 0.7071 − 0.7071i | −0.7071 − 0.7071i | −0.7071 − 0.7071i | 0.7071 − 0.7071i |
| 0.7071 − 0.7071i | 0.7071 − 0.7071i | 0.7071 + 0.7071i | 0.7071 − 0.7071i |
| −0.7071 − 0.7071i | −0.7071 − 0.7071i | −0.7071 − 0.7071i | −0.7071 − 0.7071i |
| −0.7071 − 0.7071i | −0.7071 − 0.7071i | −0.7071 − 0.7071i | −0.7071 − 0.7071i |
| −0.7071 − 0.7071i | −0.7071 − 0.7071i | −0.7071 − 0.7071i | −0.7071 − 0.7071i |
| −0.7071 − 0.7071i | −0.7071 − 0.7071i | −0.7071 − 0.7071i | −0.7071 − 0.7071i |
| −0.7071 − 0.7071i | 0.7071 + 0.7071i | −0.7071 − 0.7071i | 0.7071 + 0.7071i |
| 0.7071 − 0.7071i | 0.7071 + 0.7071i | −0.7071 + 0.7071i | −0.7071 + 0.7071i |
| −0.7071 − 0.7071i | −0.7071 + 0.7071i | 0.7071 + 0.7071i | 0.7071 − 0.7071i |
| −0.7071 + 0.7071i | 0.7071 + 0.7071i | −0.7071 + 0.7071i | −0.7071 + 0.7071i |

Shown in Table 3 are data values obtained by IFFT-transforming the symbol values of Table 2 by 16 symbol values, i.e., symbol values determined after OFDM modulation and P/S conversion. That is, Table 3 illustrates symbol values after OFDM modulation.

TABLE 3

| | | | |
|---|---|---|---|
| 0 + 5.6569i | 0.1900 − 0.9554i | 0.4142 − 1.0000i | 1.0446 − 4.8032i |
| 1.4142 + 1.4142i | 5.5685 − 3.7208i | 7.2426 + 1.0000i | −3.1077 + 1.6577i |
| 0 − 2.8284i | 0.6384 + 0.1270i | 2.4142 + 1.0000i | 2.1270 − 0.0253i |
| −1.4142 − 4.2426i | −0.7401 − 1.1077i | 1.2426 − 1.0000i | −5.7208 − 2.4861i |
| 11.3137 + 11.3137i | 0 | 0 | 0 |
| 0 | 0 | 0 | 0 |
| 0 | 0 | 0 | 0 |
| 0 | 0 | 0 | 0 |
| 0 + 2.8284i | 1.7208 + 5.5685i | 2.4142 + 1.0000i | 1.8730 + 2.1900i |
| 1.4142 − 7.0711i | 1.8730 + 0.6384i | −1.5858 + 5.8284i | 1.7208 − 2.7401i |
| −5.6569 | −0.8923 − 0.7401i | 0.4142 − 1.0000i | 2.9554 + 2.6384i |
| −1.4142 − 1.4142i | 2.9554 + 0.1900i | 4.4142 − 0.1716i | −0.8923 + 3.5685i |
| 11.3137 − 11.3137i | 0 | 0 | 0 |
| 0 | 0 | 0 | 0 |
| 0 | 0 | 0 | 0 |
| 0 | 0 | 0 | 0 |
| 4.2426 | −3.8032 + 2.8730i | −3.0000 − 3.8284i | 0.4247 − 1.8923i |
| 2.8284 − 1.4142i | −3.4861 − 1.8923i | 3.0000 + 1.8284i | −3.5879 + 2.8730i |
| 1.4142 | 0.9747 + 3.9554i | 3.0000 − 1.8284i | 2.4038 + 0.7208i |
| 2.8284 + 1.4142i | 0.6577 + 0.7208i | −3.0000 + 3.8284i | 6.4163 + 3.9554i |
| −11.3137 − 11.3137i | 0 | 0 | 0 |
| 0 | 0 | 0 | 0 |
| 0 | 0 | 0 | 0 |
| 0 | 0 | 0 | 0 |
| −1.4142 + 2.8284i | 2.7208 + 1.0378i | −3.0000 + 3.0000i | 1.1270 − 2.7208i |
| 0 − 1.4142i | 0.8730 + 7.3339i | 0.1716 − 3.8284i | −4.7208 − 1.9554i |
| −4.2426 − 2.8284i | 0.1077 − 2.2094i | 3.0000 − 3.0000i | 0.0446 − 0.1077i |
| 0 − 4.2426i | 1.9554 − 0.5055i | −5.8284 − 1.8284i | −2.1077 − 0.8730i |

Table 4 illustrates symbol values determined by pre-emphasizing the OFDM-modulated symbols of Table 3 with a pre-emphasis point 3/9.

TABLE 4

| | | | |
|---|---|---|---|
| 0.0000 + 10.8284i | 0.3801 − 1.9108i | 0.8284 − 2.0000i | 2.0892 − 9.6063i |
| 2.8284 + 2.8284i | 9.4360 − 6.3050i | 11.5461 + 1.5942i | −6.2153 + 3.3154i |
| 0.0000 − 5.6569i | 1.2768 + 0.2540i | 4.8284 + 2.0000i | 4.2540 − 0.0505i |
| −2.8284 − 8.4853i | −1.4802 − 2.2153i | 2.4853 − 2.0000i | −10.1975 − 4.4316i |
| 11.3137 + 11.3137i | 0 | 0 | 0 |
| 0 | 0 | 0 | 0 |
| 0 | 0 | 0 | 0 |
| 0 | 0 | 0 | 0 |
| 0.0000 + 5.6569i | 3.2223 + 10.4276i | 4.8284 + 2.0000i | 3.7460 + 4.3801i |
| 2.2760 − 11.3802i | 3.7460 + 1.2768i | −2.8932 + 10.6336i | 3.4416 − 5.4802i |
| −10.8284 + 0.0000i | −1.7847 − 1.4802i | 0.8284 − 2.0000i | 5.9108 + 5.2768i |
| −2.8284 − 2.8284i | 5.9108 + 0.3801i | 8.8284 − 0.3431i | −1.7847 + 7.1371i |
| 11.3137 − 11.3137i | 0 | 0 | 0 |
| 0 | 0 | 0 | 0 |
| 0 | 0 | 0 | 0 |
| 0 | 0 | 0 | 0 |
| 8.4853 | −7.6063 + 5.7460i | −6.0000 − 7.6569i | 0.8494 − 3.7847i |
| 5.6569 − 2.8284i | −6.9723 − 3.7847i | 6.0000 + 3.6569i | −7.1757 + 5.7460i |
| 2.8284 | 1.9495 + 7.9108i | 6.0000 − 3.6569i | 4.8075 + 1.4416i |
| 5.6569 + 2.8284i | 1.3154 + 1.4416i | −6.0000 + 7.6569i | 10.0181 + 6.1758i |
| −11.3137 − 11.3137i | 0 | 0 | 0 |
| 0 | 0 | 0 | 0 |
| 0 | 0 | 0 | 0 |
| 0 | 0 | 0 | 0 |
| −2.8284 + 5.6569i | 5.4416 + 2.0756i | −6.0000 + 6.0000i | 2.2540 − 5.4416i |
| 0.0000 − 2.8284i | 1.3821 + 11.6109i | 0.3431 − 7.6569i | −9.4416 − 3.9108i |
| −8.4853 − 5.6569i | 0.2153 − 4.4187i | 6.0000 − 6.0000i | 0.0892 − 0.2153i |
| 0.0000 − 8.4853i | 3.9108 − 1.0110i | −10.5474 − 3.3088i | −4.2153 − 1.7460i |

Figure 10A:
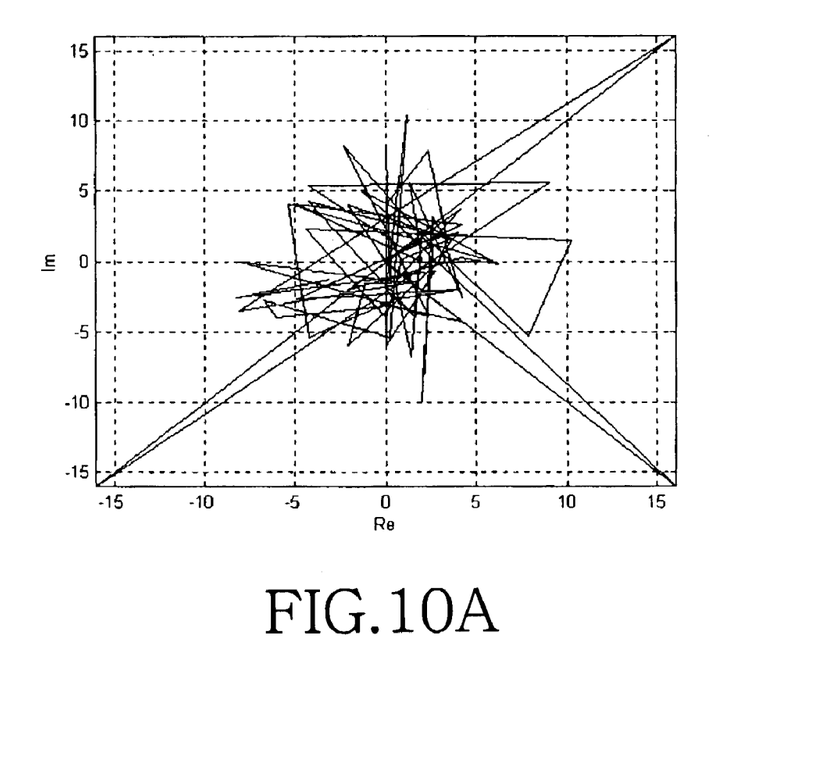
FIG. 10A illustrates a constellation for the pre-emphasized symbol values according to an embodiment of the present invention.
Figure 10B:
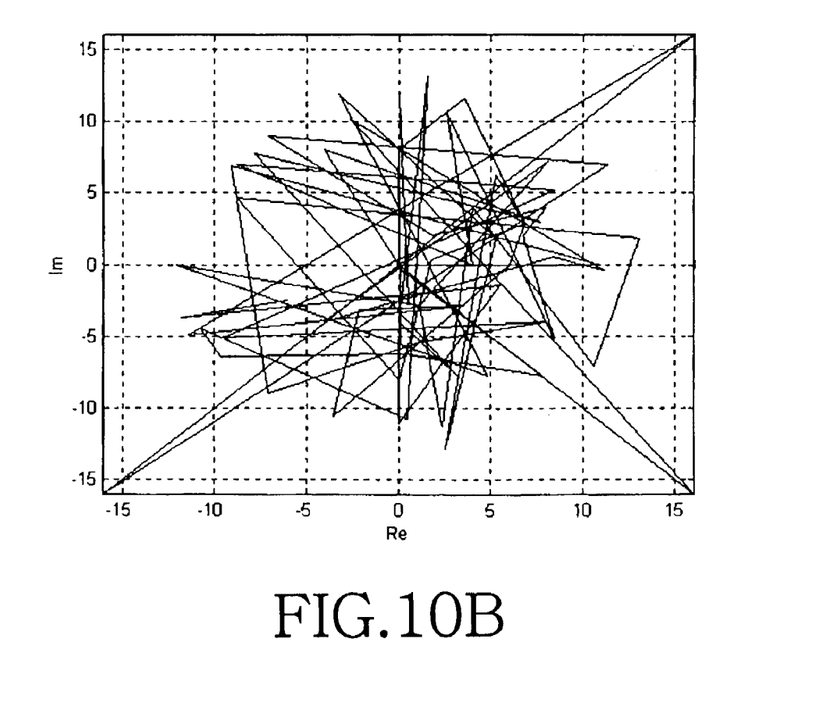
FIG. 10B illustrates a constellation for the symbol values before pre-emphasis.

FIG. 10A illustrates a constellation for the pre-emphasized symbol values shown in Table 4, and FIG. 10B illustrates a constellation for the symbol values before pre-emphasis. With reference to the constellation for the pre-emphasized symbol values illustrated in FIG. 10A, it is noted that average power is increased by the pre-emphasis. FIGS. 10A and 10B illustrate complex planes representing amplitude and phase of a signal, wherein a horizontal axis represents real amplitude of a signal and a vertical axis represents imaginary amplitude of a signal.

Embodiment of Receiver

Data obtained by de-emphasizing the data shown in Table 4 at a receiver is illustrated in Table 5. It is noted that the data shown in Table 5 is identical to the symbol values, shown in Table 3, obtained after IFFT modulation and P/S conversion.

TABLE 5

| | | | |
|---|---|---|---|
| 0.0000 + 5.6569i | 0.1900 − 0.9554i | 0.4142 − 1.0000i | 1.0446 − 4.8032i |
| 1.4142 + 1.4142i | 5.5685 − 3.7208i | 7.2426 + 1.0000i | −3.1077 + 1.6577i |
| 0.0000 − 2.8284i | 0.6384 + 0.1270i | 2.4142 + 1.0000i | 2.1270 − 0.0253i |
| −1.4142 − 4.2426i | −0.7401 − 1.1077i | 1.2426 − 1.0000i | −5.7208 − 2.4861i |
| 11.3137 + 11.3137i | 0 | 0 | 0 |
| 0 | 0 | 0 | 0 |
| 0 | 0 | 0 | 0 |
| 0 | 0 | 0 | 0 |
| 0.0000 + 2.8284i | 1.7208 + 5.5685i | 2.4142 + 1.0000i | 1.8730 + 2.1900i |
| 1.4142 − 7.0711i | 1.8730 + 0.6384i | −1.5858 + 5.8284i | 1.7208 − 2.7401i |
| −5.6569 + 0.0000i | −0.8923 − 0.7401i | 0.4142 − 1.0000i | 2.9554 + 2.6384i |
| −1.4142 − 1.4142i | 2.9554 + 0.1900i | 4.4142 − 0.1716i | −0.8923 + 3.5685i |
| 11.3137 − 11.3137i | 0 | 0 | 0 |
| 0 | 0 | 0 | 0 |
| 0 | 0 | 0 | 0 |
| 0 | 0 | 0 | 0 |
| 4.2426 | −3.8032 + 2.8730i | −3.0000 − 3.8284i | 0.4247 − 1.8923i |
| 2.8284 − 1.4142i | −3.4861 − 1.8923i | 3.0000 + 1.8284i | −3.5879 + 2.8730i |
| 1.4142 | 0.9747 + 3.9554i | 3.0000 − 1.8284i | −2.1077 − 0.8730i |
| 0.0000 − 4.2426i | 1.9554 − 0.5055i | −5.8284 − 1.8284i | −2.1077 − 0.8730i |
| −11.3137 − 11.3137i | 0 | 0 | 0 |
| 0 | 0 | 0 | 0 |
| 0 | 0 | 0 | 0 |
| 0 | 0 | 0 | 0 |
| −1.4142 + 2.8284i | 2.7208 + 1.0378i | −3.0000 + 3.0000i | 1.1270 − 2.7208i |
| 0.0000 − 1.4142i | 0.8730 + 7.3339i | 0.1716 − 3.8284i | −4.7208 − 1.9554i |
| −4.2426 − 2.8284i | 0.1077 − 2.2094i | 3.0000 − 3.0000i | 0.0446 − 0.1077i |

Table 6 illustrates data obtained by performing OFDM modulation, i.e., FFT and P/S conversion on the de-emphasized data of Table 5.

TABLE 6

| | | | |
|---|---|---|---|
| 0.7071 − 0.7071i | −0.7071 − 0.7071i | −0.7071 + 0.7071i | 0.7071 + 0.7071i |
| −0.7071 − 0.7071i | 0.7071 + 0.7071i | 0.7071 − 0.7071i | −0.7071 + 0.7071i |
| 0.7071 + 0.7071i | 0.7071 + 0.7071i | 0.7071 + 0.7071i | −0.7071 + 0.7071i |
| −0.7071 + 0.7071i | 0.7071 + 0.7071i | −0.7071 + 0.7071i | −0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | 0.7071 + 0.7071i | 0.7071 + 0.7071i |
| 0.7071 + 0.7071i | 0.7071 + 0.7071i | −0.7071 + 0.7071i | 0.7071 + 0.7071i |
| −0.7071 − 0.7071i | −0.7071 − 0.7071i | 0.7071 + 0.7071i | 0.7071 − 0.7071i |
| −0.7071 − 0.7071i | 0.7071 − 0.7071i | −0.7071 + 0.7071i | 0.7071 + 0.7071i |
| −0.7071 − 0.7071i | −0.7071 + 0.7071i | −0.7071 + 0.7071i | 0.7071 + 0.7071i |
| 0.7071 − 0.7071i | 0.7071 − 0.7071i | 0.7071 − 0.7071i | 0.7071 − 0.7071i |
| 0.7071 − 0.7071i | 0.7071 − 0.7071i | 0.7071 − 0.7071i | 0.7071 − 0.7071i |
| 0.7071 − 0.7071i | 0.7071 − 0.7071i | 0.7071 − 0.7071i | 0.7071 − 0.7071i |
| 0.7071 − 0.7071i | 0.7071 − 0.7071i | 0.7071 − 0.7071i | 0.7071 − 0.7071i |
| 0.7071 + 0.7071i | −0.7071 + 0.7071i | −0.7071 + 0.7071i | 0.7071 + 0.7071i |
| 0.7071 + 0.7071i | 0.7071 + 0.7071i | 0.7071 − 0.7071i | −0.7071 + 0.7071i |
| 0.7071 − 0.7071i | −0.7071 − 0.7071i | −0.7071 − 0.7071i | 0.7071 − 0.7071i |
| 0.7071 − 0.7071i | 0.7071 − 0.7071i | 0.7071 + 0.7071i | 0.7071 − 0.7071i |
| −0.7071 − 0.7071i | −0.7071 − 0.7071i | −0.7071 − 0.7071i | −0.7071 − 0.7071i |
| −0.7071 − 0.7071i | −0.7071 − 0.7071i | −0.7071 − 0.7071i | −0.7071 − 0.7071i |
| −0.7071 − 0.7071i | −0.7071 − 0.7071i | −0.7071 − 0.7071i | −0.7071 − 0.7071i |
| −0.7071 − 0.7071i | 0.7071 + 0.7071i | −0.7071 − 0.7071i | 0.7071 + 0.7071i |
| 0.7071 − 0.7071i | 0.7071 − 0.7071i | −0.7071 + 0.7071i | −0.7071 + 0.7071i |
| −0.7071 − 0.7071i | −0.7071 + 0.7071i | 0.7071 + 0.7071i | 0.7071 − 0.7071i |
| −0.7071 + 0.7071i | 0.7071 + 0.7071i | −0.7071 + 0.7071i | −0.7071 + 0.7071i |

Figure 11:
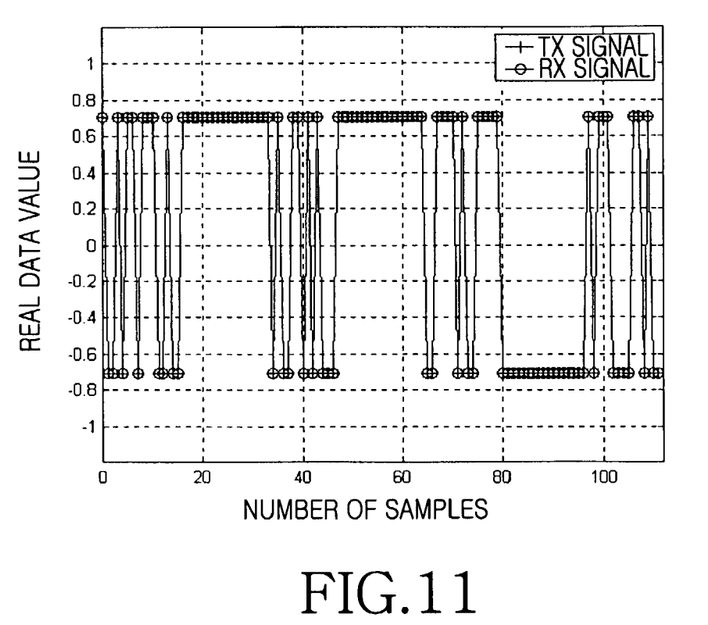
FIG. 11 is a graph illustrating a comparison between a transmission signal and a reception signal according to an embodiment of the present invention.

Comparing the data in Table 1 to Table 6, it is noted that the symbols of Table 2, modulated by QPSK mapping, are correctly demodulated into the data of Table 6 in the receiver. This is illustrated in FIG. 11. In FIG. 11, transmission signals of Table 2 are represented by "+" and reception signals of Table 6 are represented by "o," and the reception signals exactly coincide with the transmission signals. Here, since the OFDM-modulated values are identical to the values before OFDM modulation, data values of the QPSK demapper are not shown.

Figure 12:
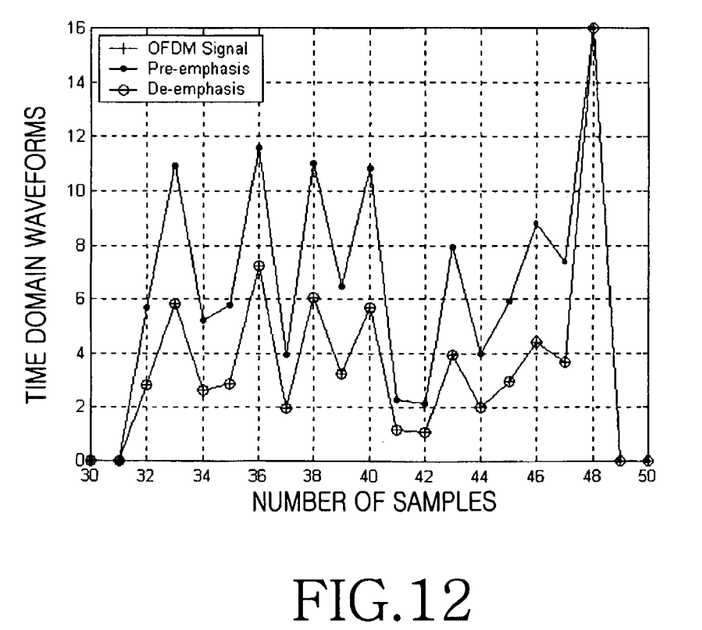
FIG. 12 a graph illustrating amplitudes of OFDM signal, pre-emphasized signal and de-emphasized signal on a time domain according to an embodiment of the present invention.

FIG. 12 illustrates amplitudes of the OFDM modulated signal, the pre-emphasized signal and the de-emphasized signal in a time domain. In FIG. 12, a vertical axis represents amplitude of a signal and a horizontal axis represents the number of data samples.

In FIG. 12, the original OFDM symbol, i.e., the data values of Table 3 are represented by "+," and the pre-emphasized data values of Table 4 are represented by "•." Further, the data values obtained by de-emphasizing the pre-emphasized data are represented by "O." It is noted from FIG. 12 that the signal determined by de-emphasizing the pre-emphasized signal at the receiver is exactly identical to the original OFDM signal.

Table 7 illustrates a comparison between a conventional OFDM mobile communication system to which the pre-emphasis technique is not applied and the novel OFDM mobile communication system to which the pre-emphasis technique is applied.

TABLE 7

| | Conventional OFDM System | Novel OFDM System | | | |
|---|---|---|---|---|---|
| | | $k_1 = L/9$ | $k_1 = 2L/9$ | $k_1 = 3L/9$ | $K_1 = 4L/9$ |
| PAPR at CCDF = 0.001 | 10.1 dB | 1.8 dB | 4.8 dB | 7.8 dB | 9.1 dB |
| PAPR Decremen | — | 8.3 dB | 5.3 dB | 2.3 dB | 1 dB |
| SNR $10^{-3}$ Required at BER = 0.001 | 6.8 dB | 8.8 dB | 2.3 dB | 2.6 dB | 6 dB |
| Improvement of BER | — | −2 dB | 4.5 dB | 4.2 dB | 0.8 dB |

Referring to Table 7, compared with the conventional OFDM mobile communication system to which the pre-emphasis technique is not applied, the OFDM mobile communication system to which the pre-emphasis technique with a pre-emphasis change point of $k_1=L/9$ is applied shows the largest PAPR decrement. However, the OFDM mobile communication system to which the pre-emphasis technique with a pre-emphasis change point of $k_1=L/9$ is applied decreases its BER performance due to great spectral regrowth. The OFDM system shows the highest BER performance and the greatest PAPR decrement when the pre-emphasis change point is 2L/9. This is because signal distortion is small and in the de-emphasis process of the receiver, a noise suppressing effect is high. That is, by increasing amplitude of a signal in accordance with Equation (3) and Equation (5), average power of an OFDM symbol is increased. As a result, the PAPR is decreased by Equation (2).

As described above, a proposed PAPR reduction apparatus and method for the OFDM mobile communication system employs the pre-emphasis technique in order to reduce PAPR, thus contributing to a drastic reduction in the PAPR and an improvement of BER performance. In addition, the proposed PAPR reduction apparatus and method for the OFDM mobile communication system is simple in structure and operation compared with the conventional apparatus and method.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling a value of symbols in order to reduce a peak-to-average power ratio (PAPR) in a transmitter for a mobile communication system for generating OFDM (Orthogonal Frequency Division Multiplexing) modulation symbols by performing IFFT (Inverse Fast Fourier Transform) on input data, the method comprising the steps of;
pre-emphasizing a symbol value S(n) with different gains according to whether the symbol value S(n) is less than a first prescribed reference value $k_1$ or not; and
converting a digital value $S_{pre}$ of the pre-emphasized symbol value into an analog signal and amplifying the analog signal at a prescribed gain,
wherein the pre-emphasized symbol value for a case where the symbol value S(n) is less than the first prescribed reference value $k_1$ ($0 \leq S(n) \leq k_1$) is defined as $$S_{pre}(n) = \frac{k_2}{k_1} S(n)$$

where $k_2$ is a second prescribed reference value and the pre-emphasized symbol value for a case where the symbol value S(n) is greater than or equal to the first prescribed reference value $k_1$ ($k_1 \leq S(n) \leq L$) is defined as $$S_{pre}(n) = \frac{L-k_2}{L-k_1} S(n) + L\left(1 - \frac{L-k_2}{L-k_1}\right)$$

where L is a maximum value of the S(n); and
wherein the prescribed reference value $k_1$ is amplitude defined as a pre-emphasis change point.

2. An apparatus for controlling a value of symbols in order to reduce a peak-to-average power ratio (PAPR) in a transmitter for a mobile communication system for generating OFDM (Orthogonal Frequency Division Multiplexing) modulation symbols by performing IFFT (Inverse Fast Fourier Transform) on input data, the apparatus comprising:
a pre-emphasis block for pre-emphasizing a symbol value S(n) with different gains according to whether the symbol value S(n) is less than a first prescribed reference value $k_1$ or not;
a digital-to-analog converter for converting a digital symbol value $S_{pre}$ output from the pre-emphasis block into an analog signal; and
a high-power amplifier for amplifying the analog signal from the digital-to-analog converter at a prescribed gain,
wherein the pre-emphasized symbol value for a case where the symbol value S(n) is less than the first prescribed reference value $k_1$ ($0 \leq S(n) \leq k_1$) is defined as $$S_{pre}(n) = \frac{k_2}{k_1} S(n)$$

where $k_2$ is a second prescribed reference value and the pre-emphasized symbol value for a case where the symbol value S(n) is greater than or equal to the first prescribed reference value $k_1$ ($k_1 \leq S(n) \leq L$) is defined as $$S_{pre}(n) = \frac{L-k_2}{L-k_1} S(n) + L\left(1 - \frac{L-k_2}{L-k_1}\right)$$

where L is a maximum value of the S(n); and
wherein the prescribed reference value $k_1$ is amplitude defined as a pre-emphasis change point.

3. A method for receiving by a receiver modulation symbols transmitted from a transmitter through IFFT (Inverse Fast Fourier Transform)-based OFDM (Orthogonal Frequency Division Multiplexing) in a mobile communication system, the method comprising the steps of:
low-noise-amplifying the modulation symbols and converting the amplified modulation symbols into digital symbol values;
de-emphasizing the symbol values $S_{pre}(n)$ with different gains according to whether the symbol values $S_{pre}$ are less than a first prescribed reference value $k_2$ or not; and
performing FFT (Fast Fourier Transform) on the pre-emphasized symbol values S(n),
wherein the pre-emphasized symbol value for a case where the symbol value $S_{pre}(n)$ is less than the first prescribed reference value $k_2$ ($0 \leq S_{pre}(n) \leq k_2$) is defined as $$S(n) = \frac{k_1}{k_2} S_{pre}(n)$$

where $k_1$ is a second prescribed reference value and the pre-emphasized symbol value for a case where the symbol value $S_{pre}(n)$ is greater than or equal to the first prescribed reference value $k_2$ ($k_2 \leq S_{pre}(n) \leq L$) is defined as $$S(n) = \frac{L-k_1}{L-k_2} S_{pre}(n) + L\left(1 - \frac{L-k_1}{L-k_2}\right)$$

where L is a maximum value of the S(n); and
wherein the prescribed reference value $k_2$ is amplitude defined as a pre-emphasis change point.

4. An apparatus for receiving modulation symbols transmitted from a transmitter through IFFT (Inverse Fast Fourier Transform)-based OFDM (Orthogonal Frequency Division Multiplexing) in a receiver for a mobile communication system, the apparatus comprising:
a low-noise amplifier for low-noise-amplifying the modulation symbols;
an analog-to-digital converter for converting the amplified modulation symbols into digital symbol values;
a de-emphasis block for de-emphasizing the symbol values $S_{pre}(n)$ with different gains according to whether the symbol values $S_{pre}$ are less than a first prescribed reference value $k_2$ or not; and an FFT (Fast Fourier Transform) block for performing FFT on the pre-emphasized symbol values $S(n)$, wherein the pre-emphasized symbol value for a case where the symbol value $S_{pre}(n)$ is less than the first prescribed reference value $k_2$ ($0 \leq S_{pre}(n)k_2$) is defined as $$S(n) = \frac{k_1}{k_2} S_{pre}(n)$$

where $k_1$ is a second prescribed reference value and the pre-emphasized symbol value for a case where the symbol value $S_{pre}(n)$ is greater than or equal to the first prescribed reference value $k_2$ $\leq S_{pre}(n) \leq L$) is defined as $$S(n) = \frac{L-k_1}{L-k_2} S_{pre}(n) + L\left(1 - \frac{L-k_1}{L-k_2}\right)$$

where L is a maximum value of the $S(n)$; and wherein the prescribed reference value $k_2$ is amplitude defined as a pre-emphasis change point.

* * * * *